(12) United States Patent
Hao et al.

(10) Patent No.: US 11,254,223 B2
(45) Date of Patent: Feb. 22, 2022

(54) OPERATING MODE OPTIMIZATION FOR ELECTRIC PROPULSION SYSTEM WITH DOWNSIZED DC-DC CONVERTER

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Suresh Gopalakrishnan, Troy, MI (US); Chengwu Duan, Shanghai (CN); Norman K. Bucknor, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 16/675,730

(22) Filed: Nov. 6, 2019

(65) Prior Publication Data
US 2021/0129686 A1    May 6, 2021

(51) Int. Cl.
*B60L 50/64*     (2019.01)
*B60L 15/20*     (2006.01)

(52) U.S. Cl.
CPC ........... *B60L 50/64* (2019.02); *B60L 15/2045* (2013.01); *B60L 2210/12* (2013.01); *B60L 2210/14* (2013.01); *B60L 2240/421* (2013.01); *B60L 2240/423* (2013.01); *B60L 2240/427* (2013.01)

(58) Field of Classification Search
CPC ........ B60K 1/04; B60L 50/64; B60L 15/2045
See application file for complete search history.

(56) References Cited

U.S. PATENT DOCUMENTS

| | | | | |
|---|---|---|---|---|
| 5,214,358 A | * | 5/1993 | Marshall | B60L 15/2054 318/139 |
| 7,138,730 B2 | * | 11/2006 | Lai | H02M 3/1582 307/82 |
| 8,817,490 B2 | * | 8/2014 | Takegami | H02M 3/33584 363/16 |
| 8,929,098 B2 | * | 1/2015 | Takegami | H02M 3/33584 363/16 |
| 9,526,135 B2 | * | 12/2016 | Lopez | H05B 45/3725 |
| 10,110,103 B1 | * | 10/2018 | Hao | H02M 3/338 |
| 10,374,517 B2 | * | 8/2019 | Tomita | H02M 3/33569 |
| 10,576,828 B2 | * | 3/2020 | Thongam | B60L 53/24 |
| 10,651,740 B1 | * | 5/2020 | Zhang | H02M 3/1582 |
| 2002/0118553 A1 | * | 8/2002 | Morita | H02M 1/4208 363/25 |

(Continued)

*Primary Examiner* — Jonathan Ng
*Assistant Examiner* — James J Triggs
(74) *Attorney, Agent, or Firm* — Quinn IP Law

(57) ABSTRACT

An electric propulsion system includes a battery pack and a DC-DC converter. The converter has a bypass switch and semiconductor switches. A traction power inverter module ("TPIM") rectifies a DC bus voltage on the voltage bus to produce an AC bus voltage. An electric machine is connected to the TPIM and energized via the AC bus voltage. A controller calculates required output power from the converter based on a requested operating mode, and speed and torque of the electric machine. When the output power exceeds a threshold, the bypass switch closes to bypass the converter. When the output power is less than the threshold, the controller uses a minimum loss voltage from a loss map as a target control voltage of the converter to optimize efficiency of the electric propulsion system.

20 Claims, 4 Drawing Sheets

(56) References Cited

U.S. PATENT DOCUMENTS

| | | | |
|---|---|---|---|
| 2010/0045102 A1* | 2/2010 | Kitanaka | H02M 3/1588 |
| | | | 307/9.1 |
| 2010/0332896 A1* | 12/2010 | Wilson | G06F 1/30 |
| | | | 714/14 |
| 2011/0011658 A1* | 1/2011 | Takizawa | B60L 15/20 |
| | | | 180/65.31 |
| 2015/0124412 A1* | 5/2015 | Keegan | H05K 13/00 |
| | | | 361/734 |
| 2016/0075241 A1* | 3/2016 | Hao | B60L 50/16 |
| | | | 701/22 |

* cited by examiner

OPERATING MODE OPTIMIZATION FOR ELECTRIC PROPULSION SYSTEM WITH DOWNSIZED DC-DC CONVERTER

INTRODUCTION

Electric propulsion systems rely on torque that is generated by one or more rotary electric machines and directed to a coupled load. Electric machines are often configured as polyphase/alternating current ("AC") devices that are energized by a direct current ("DC") voltage bus and battery pack. A power inverter module is therefore used as part of the electric propulsion system to either invert or rectify an input voltage, with the particular operation performed by the power inverter module being dependent on the present operating mode.

During a regenerating operating mode, for instance, control over the ON/OFF conducting states of individual inverter switches located within the power inverter module is used to rectify an AC input voltage from the electric machine when operating as a generator, with the power inverter module producing a DC output voltage. The DC output voltage is thereafter used to recharge constituent battery cells of the above-noted battery pack. Control of the same inverter switches during drive/motoring operating modes is used to invert a DC input voltage from the DC voltage bus/battery pack, and to thereby provide an AC output voltage suitable for energizing the electric machine.

Additionally, the voltage level on the DC voltage bus may be regulated using a DC-DC converter. Such a device includes another set of semiconductor switches whose ON/OFF conducting states are controlled in response to a DC input voltage to achieve a required DC output voltage. Electric propulsion systems may operate at relatively low torque/power levels over a substantial portion of a drive cycle, e.g., in electric vehicle applications. A downsized DC-DC converter is therefore a viable hardware option for such applications, with such an approach used for instance in U.S. Pat. No. 10,110,103B1 to Hao et al., which is hereby incorporated by reference in its entirety. While top-end torque response is sacrificed to some extent as a result of using such a downsized converter, the reduced torque response comes with the attendant benefit of improving overall energy drive efficiency of the electric propulsion system.

SUMMARY

A control method is disclosed herein for use with an electric propulsion system. The electric propulsion system includes a rechargeable battery pack or other energy storage system, a direct current-to-direct current ("DC-DC") converter, a bypass switch, a traction power inverter module ("TPIM"), a rotary electric machine, and a controller. The converter may be variously configured as a buck-boost converter, a buck converter, or a boost converter in different embodiments, and therefore is able to selectively reduce and/or increase a given DC input voltage as needed depending on the present operating mode and converter configuration. Additionally, the converter is downsized relative to a baseline "worst case" sizing scenario in which the converter is sized to a peak power requirement of the electric machine.

The controller regulates ongoing operation of the TPIM/electric machine and the buck-boost converter using a loss map, e.g., a set of lookup tables programmed in memory of the controller. Using the present method, a DC output voltage of the converter is controlled to a minimum loss voltage selected from the loss map. The controller is thus able to optimize the energy efficiency and improve the overall drive performance of the electric propulsion system.

As will be appreciated by those of ordinary skill in the art, in order to ensure responsive operation of an electric machine at peak power levels, an electric propulsion system ordinarily incorporates a DC-DC converter sized and rated to match the peak power requirement. However, sizing to the peak power requirement results in electrical losses within the converter and its associated power electronic components. For example, size-proportionate electrical losses occur within a relatively massive inductor coil of the DC-DC converter. Downsizing of the inductor coil proportionately reduces such losses. Likewise, a capacitor bank used as part of the converter hardware may be similarly downsized. Electrical losses also occur within the individual semiconductor switches of the converter, albeit to a lesser extent. The present converter is therefore downsized relative to the typical peak power-based alternative, e.g., from about 90-100 kW to about 20-30 kW in an exemplary embodiment.

During motoring modes of operation, when the converter is embodied as a buck-boost converter, the converter is operated in the available buck mode under low speed/low torque operating conditions. Such a mode reduces the voltage level of the DC voltage bus. The same converter may be operated in boost mode under high-speed/low-power conditions to boost the DC bus voltage. During regenerating modes in which the battery pack is recharged, the converter is operated in boost mode during low-speed/low-torque conditions, and in buck mode during high-speed/low-power conditions. The particular control voltage of the converter, as noted above, is determined in accordance with the loss map using the present method.

When the converter is alternatively configured as a downsized buck converter, i.e., lacking a boost mode, the converter may be selectively bypassed when the above-described buck-boost converter would otherwise operate in the boost mode. Likewise, when the converter is a downsized boost converter lacking a buck mode, the converter is similarly bypassed when the above-described buck-boost converter would otherwise operate in the buck mode. As will be appreciated, in other words, a pure buck or boost converter lacks a boost or buck mode, respectively, and therefore when the algorithm described herein calls for operation in an unavailable mode, the converter may be bypassed to further improve efficiency.

In an exemplary embodiment of the present method, the controller determines a present operating mode (regenerating or motoring), a commanded speed, and a commanded torque of the electric machine. Using these input values, the controller calculates the required output power from the DC-DC converter. The controller then compares the required output power to a calibrated power threshold, e.g., 30 kW. The converter is selectively bypassed above the calibrated power threshold by closing the bypass switch. Below the calibrated power threshold, the controller accesses the loss map, e.g., one or more lookup tables listing power losses occurring at different output voltages of the converter, and then selects the minimum loss voltage from the loss map. Calibrated loss values for each of a plurality of output voltages of the buck-boost converter may be recorded, in other words. The minimum loss voltage is thus a selected one of the output voltages having the lowest magnitude of the calibrated loss values.

The controller thereafter controls the actual output voltage of the converter in either buck or boost mode, or bypasses the converter when the required mode is not available for the given converter configuration. The buck, boost, or bypass mode is selected based on the requested operating mode of the electric propulsion system, i.e., motoring or regenerating. The mode selection is also predicated on whether the minimum loss voltage determined from the loss map is less than the DC bus voltage. Thereafter, the controller generates direct-axis ("d-axis") and quadrature axis ("q-axis") commands for control of the electric machine based on the DC bus voltage and the commanded torque and speed of the electric machine.

The bypass switch may be controlled in such a way as to balance the voltage across the bypass switches, i.e., the output voltage of the battery pack ("battery voltage") and the DC bus voltage. The bypass switch may be optionally embodied as a mechanical relay to help minimize component cost, and to minimize internal resistance when the bypass switch is in an ON/conducting state. It is desirable to immediately close the bypass switch when the voltage across the bypass switch is balanced. However, a typical opening time of a mechanical relay is on the order of 5-10 ms. Therefore, PWM control over designed converter switches may be used in certain embodiments to properly balance the voltage across the bypass switch as set forth herein.

The downsized DC-DC converter is a bi-directional converter that may utilize converter switches, e.g., MOSFETS in certain embodiments, with Gallium Nitride ("GaN") and Silicon Carbide ("SiC") being two possible materials of construction of the converter switches. The bypass switch may be a mechanical contactor or a semiconductor switch.

A method for controlling the electric propulsion system includes calculating, via a controller, a required output power from the converter based on a requested operating mode, a commanded speed, and a commanded torque of the electric machine. The method also includes comparing the required output power to a calibrated power threshold, and controlling the converter via the controller. Control of the DC-DC converter includes, when the required output power exceeds the calibrated power threshold, closing the bypass switch via the controller to thereby bypass the converter. When the required output power is less than the calibrated power threshold, the controller determines a minimum loss voltage from a loss map, and thereafter uses the minimum loss voltage as a target control voltage of the converter to thereby optimize efficiency of the electric propulsion system.

A vehicle is also disclosed that includes one or more road wheels and the electric propulsion system. In this embodiment, the controller calculates a required output power from the buck-boost converter based on a requested output speed and torque of the electric machine. When the required output power is less than a calibrated power threshold, the controller determines a minimum loss voltage of the electric propulsion system using a loss map. The loss map contains calibrated loss values for each of a plurality of output voltages of the converter. The minimum loss voltage is one of the output voltages that is lowest in magnitude among the calibrated loss values. Additionally, the controller uses the minimum loss voltage as a target control voltage of the converter, which may include operating the converter in buck mode or boost mode, if available.

The above-noted and other features and advantages of the present disclosure are readily apparent from the following detailed description of the best modes for carrying out the disclosure when taken in connection with the accompanying drawings.

Figure 1:
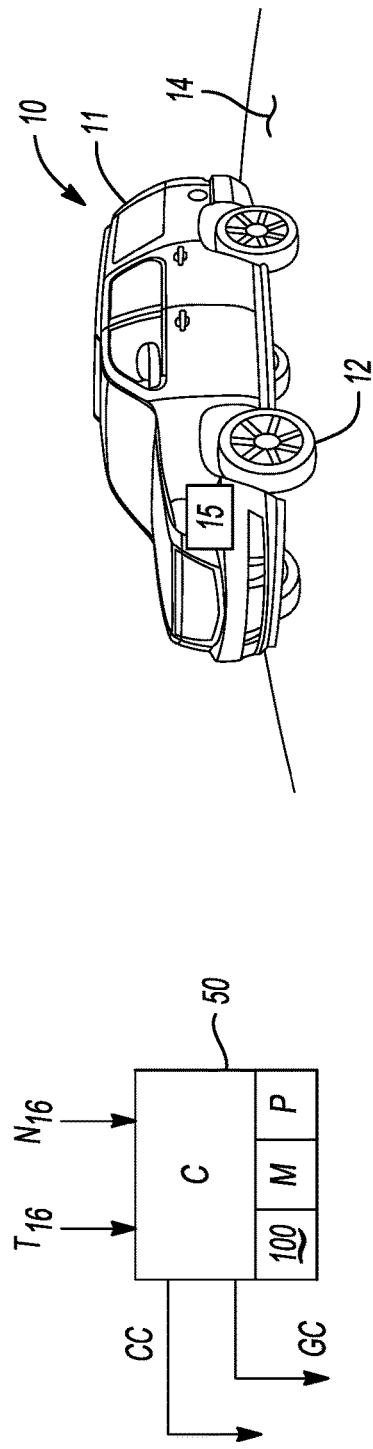
FIG. 1 is a schematic illustration of an electric propulsion system having a downsized DC-DC converter that is controlled according to the method set forth herein.
Figure 1:
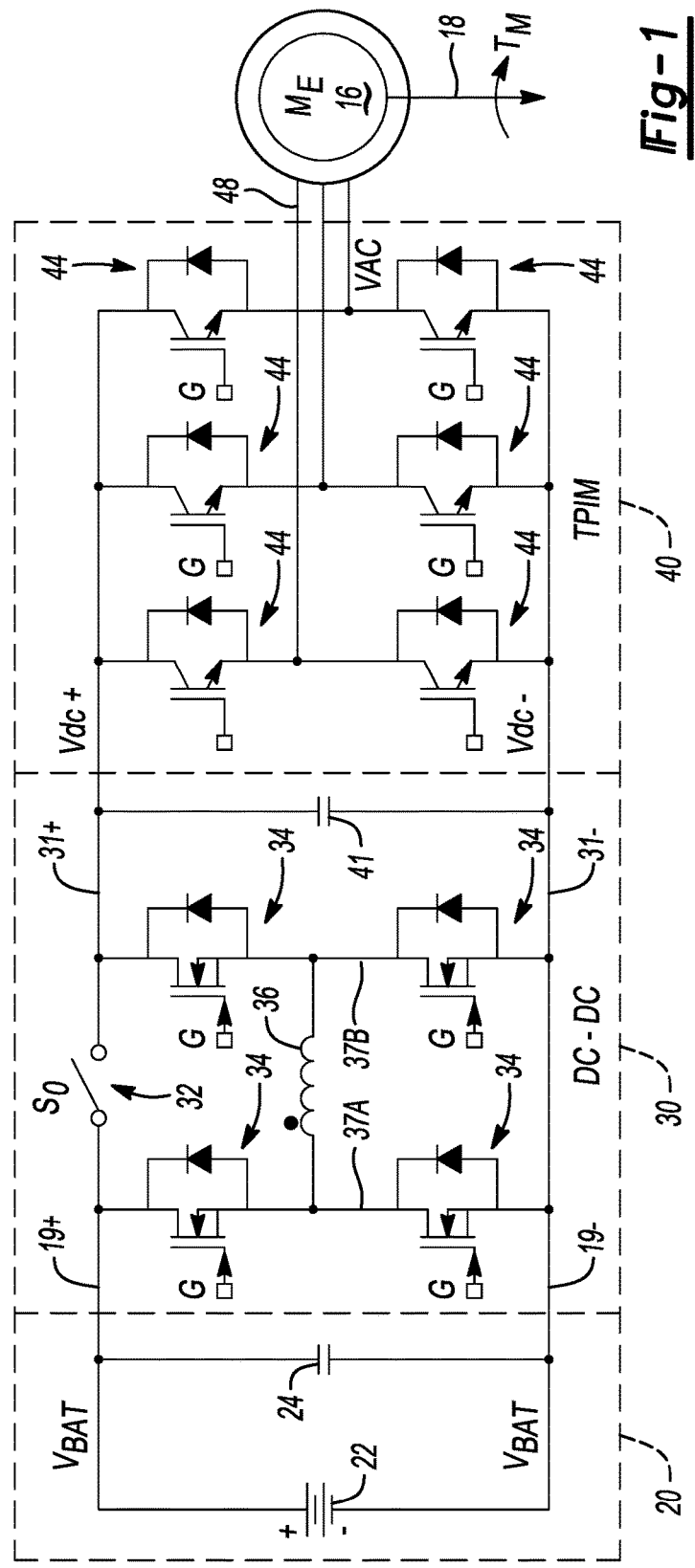

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers refer to like components throughout the several views, FIG. 1 depicts a mobile platform 10 having a body 11 and an electric propulsion system 15. The mobile platform 10 may be optionally embodied as a motor vehicle, a robot, etc., and thus equipped in such embodiments with road wheels 12 in rolling contact with a road surface 14. While the mobile platform 10 is one possible example of a system benefitting from the electric propulsion system 15, other beneficial applications for the electric propulsion system 15 may also be envisioned, including but not limited to stationary power plants, mobile platforms, and other types of land, air, or marine vehicles.

The electric propulsion system 15 includes a polyphase electric machine ("$M_E$") 16 having a rotatable output shaft 18. When the electric machine 16 is energized via application of a polyphase/alternating current voltage ("VAC") to individual phase windings 48 of the electric machine 16, output torque (arrow $T_M$) is generated and delivered via the output shaft 18 to a coupled load, such as to the road wheels 12 in the illustrated vehicular application. The electric machine 16 may be optionally embodied as a three-phase/multi-phase motor or motor/generator unit, with each of the phase windings 48 conducting a corresponding phase current.

The electric propulsion system 15 of FIG. 1 includes a battery pack 20 or other application-suitable energy storage system. The electric propulsion system 15 also includes a direct-current/direct-current ("DC-DC") converter 30 and a traction power inverter module ("TPIM") 40. As described below, the converter 30 may be variously embodied as a buck-boost converter (FIG. 1), a buck converter (FIG. 1A), or a boost converter (FIG. 1B), with the disclosed method 100 being adaptable for use with each of the various embodiments. The battery pack 20 includes a plurality of battery cells 22, e.g., rechargeable lithium ion battery cells arranged in a stack, and a capacitor 24 arranged in parallel with the battery cells 22. The number and arrangement of the battery cells 22 may vary with the intended application, for instance with ninety-six or more such battery cells 22 used in certain high-voltage applications. A battery voltage ($V_{bat}^+$, $V_{bat}^-$) is delivered to respective positive and negative battery voltage rails 19⁺ and 19⁻, with a DC bus voltage ($V_{dc}^+$ and $V_{dc}^-$) being present on inverter bus rails 31⁺ and 31⁻ downstream, i.e., on the output side of, the DC-DC converter 30. If the DC-DC converter 30 is active and the bypass switch S0 is open, the battery voltage ($V_{bat}^+$, $V_{bat}^-$) will be different from the DC bus voltage ($V_{dc}^+$, $V_{dc}^-$) depending on the control scheme used for the DC-DC converter 30.

The TPIM 40, which is electrically connected to the phase windings 48 of the electric machine 16, includes a first plurality of semiconductor switches 44, hereinafter referred to as inverter switches 44 for clarity. The inverter switches 44 are arranged in upper and lower sets as shown, with the terms "upper" and "lower" referring to the inverter switches 44 connected to the positive and negative inverter bus rails 31⁺ and 31⁺, respectively. The inverter switches 44 may be embodied as voltage-controlled bipolar switching devices in the form of insulated gate bipolar transistors ("IGBTs"), metal-oxide semiconductor field effect transistors ("MOSFETs"), wide band gap devices, or other suitable switches having a corresponding gate terminal ("G") to which a gate voltage signal (arrow GC) is applied to change the corresponding ON/OFF state of the inverter switches 44.

Still referring to FIG. 1, the DC-DC converter 30 is optionally configured as a buck-boost converter having another set of semiconductor switches 34, hereinafter converter switches 34. As will be appreciated, the buck and boost modes of such a converter 30 are voltage-reducing and voltage-increasing modes of operation, respectively. As with the inverter switches 44, the converter switches 34 may be constructed of high-efficiency switches such as Gallium Nitride ("GaN") or Silicon Carbide ("SiC") MOSFETs, IGBTs, or other suitable switching devices arranged in upper and lower switching sets. Each one of the upper converter switches 34 is connected to a respective one of the lower converter switches 34 via a respective voltage leg 37A and 37B, with an inductor coil 36 extending between the voltage legs 37A and 37B.

The DC-DC converter 30 of FIG. 1 additionally includes a bypass switch 32, which is also labeled $S_0$ for clarity. The bypass switch 32 is selectively opened or closed in response to switching control signals (arrow CC) transmitted by a controller (C) 50. The bypass switch 32 may be optionally constructed of an electromechanical relay, e.g., a bi-directional GaN or SiC mechanical relay. The bypass switch 32 is disposed between the positive battery voltage rail 19⁺ and the positive inverter voltage bus rail 31⁺. Thus, closing of the bypass switch 32 in response to the switching control signals (arrow CC) causes the converter 30 to be bypassed, with the particular conditions calling for closing of the bypass switch 32 and the resultant bypassing of the converter 30 being determined in real-time by the controller 50 as set forth below with reference to FIG. 3.

Figure 1B:
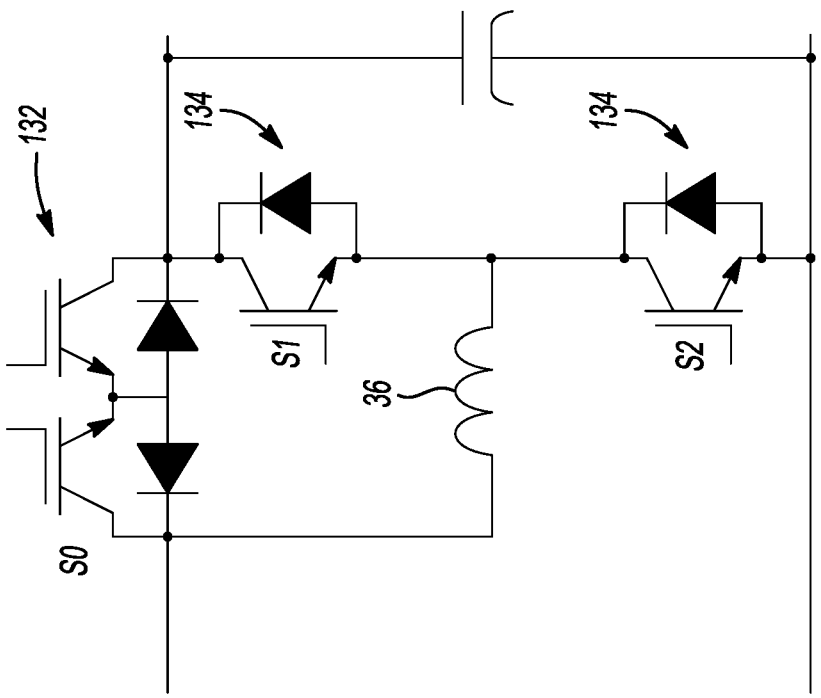
FIGS. 1A and 1B are schematic illustrations of an alternative buck converter and boost converter, respectively, that may be used as part of the electric propulsion system of FIG. 1.
Figure 1A:
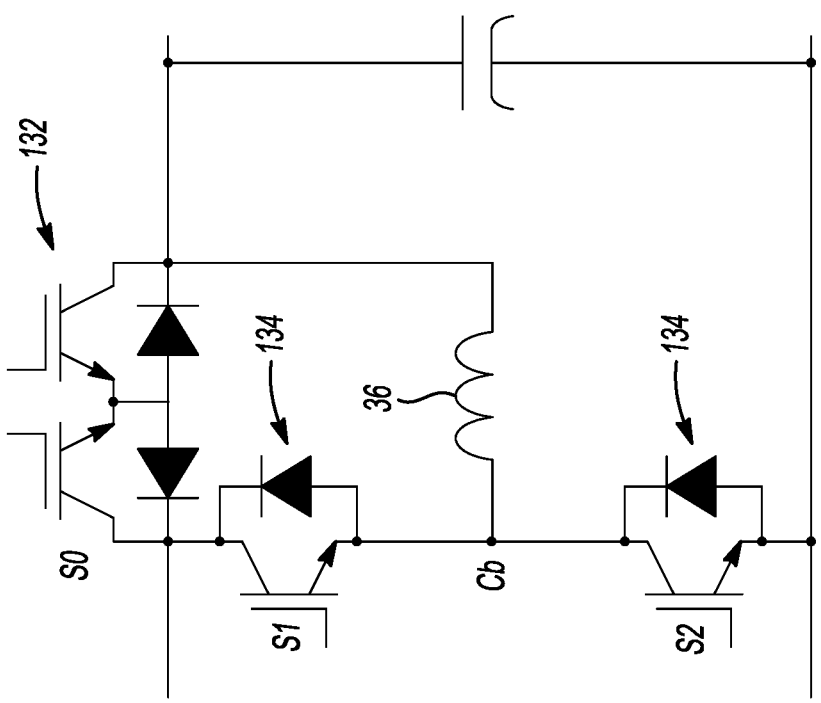

Referring briefly to FIGS. 1A and 1B, the DC-DC converter 30 may be alternatively configured as a downsized buck converter (FIG. 1A) or a downsized boost converter (FIG. 1B). The embodiment of FIG. 1A, during motoring modes, will operate during low-speed/low-torque conditions to reduce the inverter bus voltage from the level of the battery voltage to a lower value, in a regenerating mode under high-speed/low-power conditions to reduce the inverter bus voltage between the inverter bus rails 31⁺ and 31⁻ to the level of the battery voltage, and may be selectively bypassed during other conditions. The boost converter embodiment of FIG. 1B may operate during high-speed/low-power conditions during motoring modes to boost the inverter bus voltage from the level of the battery voltage to a higher value, during regenerating modes under low-speed/low-torque conditions to boost the inverter bus voltage to a battery voltage levels, and may be selectively bypassed in other conditions. As with FIG. 1, the embodiments of FIGS. 1A and 1B use switch S0 as a bypass switch to bypass the DC-DC converter 30.

The controller 50 is in communication with the electric machine 16 over a controller area network ("CAN") bus or other communication bus, and may be configured as a single device or as a distributed control device. Although omitted from FIG. 1, the connectivity of the controller 50 to the electric propulsion system 15 may include transfer conductors and/or wireless control links or paths suitable for transmitting and receiving the control signals (arrow CC). The controller 50 may include a processor (P) and tangible, non-transitory memory (M), including read only memory in the form of optical, magnetic, or flash memory. The controller 50 also includes sufficient amounts of random-access memory and electrically-erasable programmable read only memory, as well as a high-speed clock, analog-to-digital and digital-to-analog circuitry, and input/output circuitry and devices, as well as appropriate signal conditioning and buffer circuitry. Computer-readable instructions are recorded in memory (M) embodying a method 100, with the execution of such logic by the processor (P) causing the controller 50 to manage the flow of electrical power within the electric propulsion system 15.

In the present method 100, the controller 50 is programmed to receive an operator-requested or autonomously-generated commanded motor torque (arrow $T_{16}$). Such a value may be available from a motor control processor (not shown) of the electric machine 16 using, for instance, a lookup table indexed or referenced by the power and commanded rotational speed (arrow $N_{16}$) of the electric machine 16. The controller 50 uses the commanded motor torque (arrow $T_{16}$) and speed (arrow $N_{16}$) to determine precisely when to open or close the bypass switch 32 according to the method 100, which occurs as set forth below based on a minimum loss voltage extracted from a loss map 52 stored in memory (M) or otherwise accessible by the controller 50.

Figure 2:
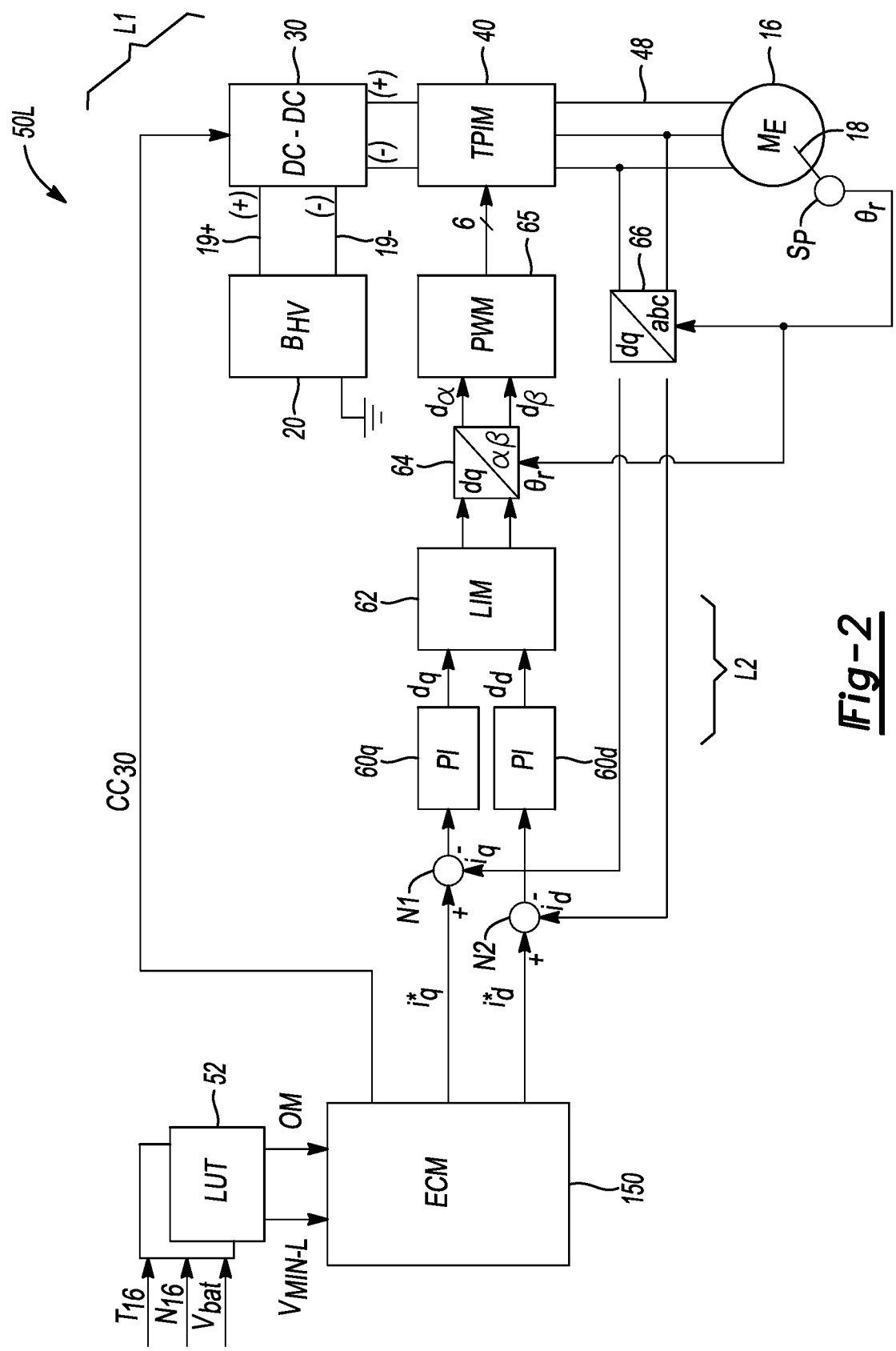
FIG. 2 is a schematic illustration of exemplary dual-loop control logic usable for executing the present method.

FIG. 2 depicts exemplary dual-loop control logic 50L for implementing the present method 100 via the controller 50 of FIG. 1 when establishing one of two different operating modes of the electric propulsion system 15, i.e., motoring and regenerating. For illustrative consistency, control is described for a buck-boost embodiment of the DC-DC converter 30, with modifications being possible for the alternative buck and boost embodiments of respective FIGS. 1A and 1B.

In the motoring mode, i.e., when the electric machine 16 is energized in its capacity as an electric traction motor under low-speed/low-torque operating conditions, the controller 50 operates the DC-DC converter 30 in buck mode. This control action effectively reduces the DC bus voltage between inverter bus rails 31⁺ and 31⁻ of FIG. 1. Under high-speed/low-power operating conditions, the controller 50 operates the converter 30 in boost mode to increase the DC bus voltage. In the regenerating mode, the controller 50 operates the converter 30 in boost mode during low-speed/low-torque operating conditions, and in buck mode during high-speed/low-power operating conditions.

The control logic 50L enables efficiency optimization of the electric propulsion system 15 of FIG. 1 based on the commanded torque (arrow $T_{16}$) and speed (arrow $N_{16}$) and the above-noted loss map 52. For each input speed and torque command combination, the controller 50 evaluates the magnitudes of different predetermined power losses recorded in the loss map for a range of different output voltages of the DC-DC converter 30, e.g., 100-500V. The minimum value in the loss map 52 has a corresponding voltage referred to herein as the "minimum loss voltage". The controller 50 uses this value as the target/control voltage for the converter 30, and also adjusts the d-axis and q-axis commands to the electric machine 16 as needed based on the speed, torque, and minimum loss voltage.

In the exemplary embodiment of the control logic 50L, an electronic control module ("ECM") 150, i.e., a logic and hardware component of the controller 50 of FIG. 1 used to control the operation of the DC-DC converter 30 shown at far right of FIG. 2, receives the commanded torque (arrow $T_{16}$), the commanded speed (arrow $N_{16}$), and the present battery voltage ($V_{bat}$), and then compares the received values to the lookup tables ("LUT") embodying the loss map 52. Such values may be calibrated in the case of the loss map 52, or measured, calculated, or otherwise determined in real-time for the commanded torque, speed, and battery voltage. The above-noted minimum loss voltage ("$V_{MIN-L}$") is used as the control voltage for the DC-DC converter 30 as noted above.

The loss map 52 outputs the minimum loss voltage and, based on the torque and speed, the present operating mode ("OM"), i.e., the motoring or regenerating mode noted above. The ECM 150 may receive the minimum loss voltage and present operating mode as input signals. Downstream of the ECM 150, separate control loops L1 and L2 respectively control operation of the DC-DC converter 30 and the TPIM 40 in response to output signals from the ECM 150.

With respect to control loop L1 used for the DC-DC converter 30, the ECM 150 outputs a control voltage signal $CC_{30}$ to the converter 30 that commands the minimum loss voltage as provided by the loss map 52. For instance, the control voltage signal $CC_{30}$ may a proportional voltage signal that commands a particular output voltage from the DC-DC converter 30, with the output voltage being equal to the minimum loss voltage. The DC bus voltage across the inverter bus rails $31^+$ and $31^-$ is thus set to the minimum loss voltage.

Still referring to FIG. 2, the control loop L2 controls operation of the TPIM 40, which is connected to the DC-DC converter 30 such that regulation of the output voltage from the converter 30 affects the input voltage to the TPIM 40 and vice versa. The TPIM 40 is connected to the phase leads 48 of the electric machine 16. As part of the control loop L2, the ECM 150 outputs a q-axis command $i_q^*$ to a first node N1 and a d-axis command $i_d^*$ to a second node N1 based on the minimum loss voltage. As used in the art, the term "d-axis current command" refers to a flux-generating current command operating on the direct axis of a rotating dq frame of reference, while the q-axis current command (quadrature axis) is the torque-producing current of the electric machine 16. The first node N1 also receives the magnitude of the q-axis current as a feedback term ($i_q$) from an axis transformation block 66, subtracts this q-axis term from the q-axis command $i_q^*$, and transmits the difference to a proportional-integral ("PI") logic block 60q. Similarly, the second node N2 receives a d-axis current as a feedback term ($i_d$) from the axis transformation block 66, subtracts the d-axis feedback term ($i_d$) from the d-axis command $i_d^*$, and transmits the difference to a PI logic block 60d.

Within the PI logic blocks 60q and 60d, the controller 50 derives a q-axis voltage ($d_q$) and a d-axis voltage ($d_d$), with the q-axis voltage ($d_q$) and the d-axis voltage ($d_d$) representing a required adjustment to the present voltage commands to the TPIM 40. The magnitude of such voltage adjustments may be limited via a voltage limiting block ("LIM") 62, e.g., using a bandpass filter, and fed into an axis transformation block 64. Within transformation block 64, the controller 50 transforms the rotating dq frame of reference to a fixed reference frame, i.e., the αβ frame of reference. As will be appreciated, the particular choice of transformation used to implement in the control logic 50L will depend on the choice of current controller used to implement loop L2, with control in the αβ frame being typical for control of polyphase electric machines.

The voltage outputs of block 64 are thus the transformed voltages $d_α$ and $d_β$, which are thereafter fed into a modulation block 65 as control voltages, with block 65 being a pulse width modulation ("PWM") controller in the depicted non-limiting embodiment. In response to the control voltages $d_α$ and $d_β$, the modulation block 65 outputs multiple gate voltage signals to the gate terminals (G) of the individual inverter switches 44 (see FIG. 1). In an exemplary three-phase embodiment of the electric machine 16, for instance, there would be six such gates signals, as indicated by the numeral "6" in FIG. 2. The energized TPIM 40 thereafter powers the electric machine 16. Phase voltages are measured/calculated and input to the phase transformation block 66, along with a present rotary position ($θ_r$) of the rotor 18 as measured by a position sensor $S_p$. The phase transformation block 66 thereafter generates the q-axis and d-axis currents $i_q$ and $i_d$ as feedback terms, which in turn are fed into nodes N1 and N2 as noted above.

Figure 3:
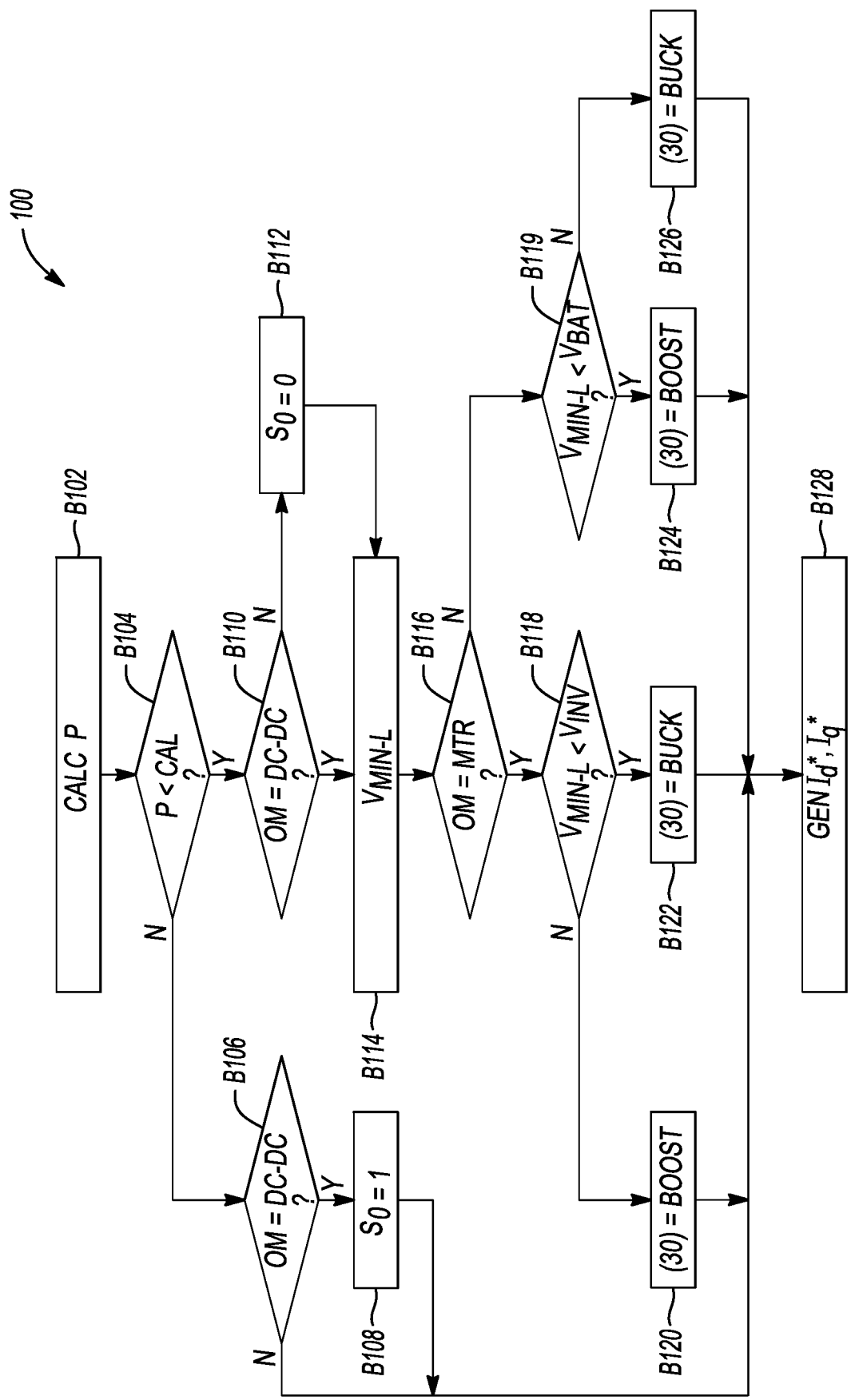
FIG. 3 is a flow chart describing a method for controlling the downsized DC-DC converter and the rotary electric machine of FIG. 1 according to a minimum loss voltage.

Referring to FIG. 3, the method 100 according to an exemplary embodiment commences with block B102. The controller 50 receives the commanded speed (arrow $N_{16}$) and torque (arrow $T_{16}$) of the electric machine 16, as shown in FIG. 2, which may include processing pedal travel or other control inputs from a human operator or an autonomous controller. The controller 50 calculates the required input power ("CALC P") to the electric machine 16 using the commanded speed and torque before proceeding to block B104.

At block B104, the controller 50 compares the required input power to a calibrated power threshold ("P<CAL?"). For instance, the calibrated power threshold may be 30-40 kW in an application in which peak power requirements might approach 90-100 kW, i.e., 30-40 percent of peak power. The method 100 proceed to block B106 when the required input power exceeds the power threshold, and to block B110 in the alternative.

Block B106 includes determining, via the controller 50, whether the DC-DC converter 30 is required to be bypassed in the present operating mode ("OM=DC-DC?"). Block B106 may include checking the status of switch S0, for instance, using a control signal sent to the switch S0 and/or processing status bits of the switch S0 via the controller 50. The method 100 proceeds to block B108 when the converter 30 is required to be bypassed using such criteria. The method 100 otherwise proceeds directly to block B128.

At block B108, in response to the determination made in block B104 that the electric machine 16 is operating above the calibrated power threshold noted above, the controller 50 closes the bypass switch 32 of FIG. 1 ("$S_0$=1") to bypass the DC-DC converter 30, and thereafter proceeds to block B128.

Block B110 is analogous to block B106, and includes determining, via the controller 50, whether the DC-DC converter 30 is required to be active in the present operating mode ("OM=DC-DC?"). The method 100 proceeds to block B112 when the converter 30 is not active, and to block B114 in the alternative when the converter 30 is active.

Block B112 includes opening the bypass switch 32 of FIG. 1 before proceeding to block B114.

Block B114 entails determining losses of the electric propulsion system 10 of FIG. 1 using the loss map 52 shown in FIG. 2. As noted above, the controller 50 reads the values stored in the loss map 52 at different possible control voltages of the converter 30 at the same torque and speed condition, and selects the minimum loss voltage ("$V_{MIN-L}$"). The loss map 52 may be based on losses in the electric propulsion system 15 itself, or based on input power to the TPIM 40 or output power from the battery pack 20 in different embodiments. The method 100 then proceeds to block B116.

At block B116, the controller 50 determines if the present operating mode is a motoring mode ("OM=MTR?"). The method 100 proceeds to block B118 when the present operating mode is a motoring mode, and to block B119 when the present operating mode is not a motoring mode.

At block B118, the controller 50 compares the minimum loss voltage ($V_{MIN-L}$) from block B114 to the present inverter bus voltage, represented in block B118 as $V_{INV}$, to determine which value is greater, i.e., "$V_{MIN-L} < V_{INV}$?". The method 100 proceeds to block B120 when the minimum loss voltage exceeds the present inverter bus voltage, and to block B122 in the alternative when the inverter bus voltage exceed the minimum loss voltage.

Block B119 includes comparing the minimum loss voltage ($V_{MIN-L}$) from block B114 to the battery voltage to determine which value is greater, i.e., "$V_{MIN-L} < V_{BAT}$?" The method 100 proceeds to block B124 when the battery voltage exceeds the minimum loss voltage, and to block B126 in the alternative when the minimum loss voltage exceeds the battery voltage.

Block B120 includes operating the DC-DC converter 30 in boost mode, if the converter 30 is a boost or buck-boost type, while the electric propulsion system is in the motoring mode. In such a mode, the converter 30 increases the inverter bus voltage to the minimum loss voltage, and then continues to block B128. When the converter 30 is a buck converter, block B120 includes bypassing the converter 30 via the switch S0 of FIG. 1A.

Block B122 includes operating the DC-DC converter 30 in buck mode while the electric propulsion system is in a motoring mode, and when the converter 30 is a buck-boost or buck type. In such a mode, the converter 30 reduces the inverter bus voltage from its present level down to the minimum loss voltage from block B114, and then continues to block B128. When the converter 30 is a boost converter, block B122 includes bypassing the converter 30 via the switch S0 of FIG. 1A.

At block B124, the controller 50 operates the DC-DC converter 30 in boost mode, again if the converter 30 is a buck-boost (FIG. 1) or boost (FIG. 1B) type, and while the electric propulsion system is in a regenerating mode. In such a mode, the converter 30 increases the bus voltage to the battery voltage to charge the battery, and then proceeds to block B128. When the converter 30 is a buck converter, block B124 includes bypassing the converter 30 via the switch S0 of FIG. 1A.

At block B126, the controller 50 operates the DC-DC converter 30 in buck mode while the electric propulsion system is in a regenerating mode, and provided the converter 30 is configured as a buck-boost (FIG. 1) or buck (FIG. 1A) type. The converter 30 reduces the bus voltage down to the battery voltage before continuing to block B128. Block B126 includes bypassing the converter 30 via the switch S0 when the converter 30 is a boost converter, e.g., as exemplified in FIG. 1B.

Block B128 entails generating the d-axis and q-axis current commands, i.e., $i_d$* and $i_q$*, based on the bus voltage and the commanded torque and speed of the electric machine 16.

Using the method 100 and the control logic 50L of FIG. 2, the size of the DC-DC converter 30 may be effectively reduced, e.g., to 20-30 kW or less for a peak power requirement of 90-100 kW. As will be appreciated, some electric vehicle embodiments require peak power of about 200 kW. However, such vehicles may require only 30 kW of power for the vast majority of everyday drive cycles. Use of 20-30 kW embodiment of the DC-DC converter 30 in buck mode in such an embodiment may enable a 15-percent loss reduction. These and other benefits will be readily appreciated by one of ordinary skill in the art in view of the present disclosure.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed:

1. An electric propulsion system comprising:
    a voltage bus having positive and negative bus rails and DC bus voltage across the bus rails;
    a battery pack connected between the positive and negative bus rails of the voltage bus and providing a battery voltage;
    a direct current-to-direct current ("DC-DC") converter that includes a set of semiconductor switches connected between the positive and negative bus rails, and having a bypass switch connected to the positive bus rail;
    a traction power inverter module ("TPIM") having a DC-side connected to the buck-boost converter at an inverter bus voltage, and having an alternating current ("AC")-side, wherein the TPIM is configured to rectify the DC inverter voltage to thereby produce an AC bus voltage;
    a rotary electric machine connected to the AC-side of the TPIM and energized via the AC bus voltage; and
    a controller configured to calculate a required output power from the DC-DC converter based on a requested operating mode, a commanded speed, and a commanded torque of the electric machine, to compare the required output power to a calibrated power threshold, and:
        when the required output power exceeds the calibrated power threshold, to close the bypass switch and thereby bypass the DC-DC converter; and
        when the required output power is less than the calibrated power threshold, to determine a minimum loss voltage from a loss map, and to thereafter use the minimum loss voltage as a target control voltage of the DC-DC converter to thereby optimize efficiency of the electric propulsion system.

2. The electric propulsion system of claim 1, wherein the controller is configured to generate d-axis and q-axis commands for control of the TPIM and the electric machine based on the commanded torque, the commanded speed, and the minimum loss voltage.

3. The electric propulsion system of claim 1, wherein the controller is configured to transmit pulse width modulation ("PWM") control signals to the pair of the semiconductor switches of the DC-DC converter to thereby balance the DC bus voltage with the battery voltage prior to opening or closing the bypass switch.

4. The electric propulsion system of claim 1, wherein the bypass switch is a mechanical relay or bi-directional semiconductor switches.

5. The electric propulsion system of claim 1, wherein the semiconductor switches in the DC-DC converter are bi-directional Gallium Nitride or Silicon Carbide switches.

6. The electric propulsion system of claim 1, wherein the loss map includes a lookup table populated with calibrated loss values for each of a plurality of output voltages of the DC-DC converter, and wherein the minimum loss voltage is a selected one of the output voltages having a lowest magnitude among the calibrated loss values.

7. The electric propulsion system of claim 1, wherein the controller includes control logic having a first control loop in which the controller regulates operation of the DC-DC converter via the minimum loss voltage, and a second control loop in which the controller regulates operation of the TPIM via a proportional-integral current controller.

8. The electric propulsion system of claim 1, wherein the DC-DC converter is configured as a buck-boost converter or a boost converter, and the controller is configured to increase the inverter bus voltage to the minimum loss voltage when the operating mode is the motoring mode, the commanded speed is above a speed threshold, and the required output power is less than the calibrated power threshold.

9. The electric propulsion system of claim 8, wherein in a regenerating mode, the controller is configured to boost the inverter bus voltage to the battery voltage when the commanded speed is below a speed threshold and the required output power is less than a calibrated power threshold.

10. The electric propulsion system of claim 1, wherein the DC-DC converter is configured as a buck-boost converter or a buck converter, and in the motoring mode, the controller is configured to decrease the inverter bus voltage to the minimum loss voltage when the commanded speed is below a speed threshold and the required output torque is less than a torque threshold.

11. The electric propulsion system of claim 10, wherein in a regenerating mode, the controller is configured to decrease the inverter bus voltage to the battery voltage when the commanded speed is above a speed threshold and the required output power is less than a calibrated power threshold.

12. The electric propulsion system of claim 1, further comprising a road wheel connected the electric machine.

13. A method for controlling an electric propulsion system having a DC bus voltage across positive and negative bus rails, a battery pack connected to the positive and negative bus rails and providing a battery voltage, direct current-to-direct current ("DC-DC") converter, a traction power inverter module ("TPIM") having a DC-side connected to the DC-DC converter at an inverter bus voltage, and a rotary electric machine connected to an AC-side of the TPIM, the method comprising:

calculating, via a controller, a required output power from the DC-DC converter based on a requested operating mode, a commanded speed, and a commanded torque of the electric machine;

comparing the required output power to a calibrated power threshold; and controlling the DC-DC converter via the controller, including:

when the required output power exceeds the calibrated power threshold, closing a bypass switch of the DC-DC converter via the controller to thereby bypass the DC-DC converter; and when the required output power is less than the calibrated power threshold, determining a minimum loss voltage from a loss map via the controller, and thereafter controlling a voltage of the DC-DC converter using the minimum loss voltage as a target control voltage of the DC-DC converter.

14. The method of claim 13, further comprising: generating d-axis and q-axis commands for the TPIM and the electric machine, via the controller, based on the commanded torque, the commanded speed, and the minimum loss voltage.

15. The method of claim 13, further comprising: transmitting pulse width modulation ("PWM") control signals to the pair of the semiconductor switches of the DC-DC converter to thereby balance the DC bus voltage and the battery voltage prior to opening or closing the bypass switch.

16. The method of claim 13, wherein the bypass switch is a mechanical relay or a semiconductor switch.

17. The method of claim 13, wherein the loss map includes a lookup table populated with calibrated loss values for each of a plurality of output voltages of the DC-DC converter, and wherein determining the minimum loss voltage from the loss map includes selecting one of the output voltages having a lowest magnitude among the calibrated loss values.

18. The method of claim 13, further comprising: regulating operation of the DC-DC converter via the minimum loss voltage using a first control loop, and regulating operation of the TPIM via a proportional-integral logic block of the controller using a second control loop.

19. The method of claim 13, further comprising powering a road wheel via the electric machine.

20. A battery electric vehicle comprising:
at least one road wheel; and
an electric propulsion system comprising:
a DC-DC converter connected to a DC voltage bus, the DC-DC converter having a buck mode, a set of semiconductor switches connected between the positive and negative bus rails, and a bypass switch connected to the positive bus rail;
a traction power inverter module ("TPIM") connected to the DC voltage bus;
a rotary electric machine connected to the TPIM and the at least one road wheel; and
a controller configured to calculate a required output power from the DC-DC converter based on a requested output speed and torque of the electric machine, and when the required output power is less than a calibrated power threshold, to:
determine a minimum loss voltage of the electric propulsion system using a loss map, wherein the loss map contains calibrated loss values for each of a plurality of output voltages of the DC-DC converter, and the minimum loss voltage is one of the output voltages that is lowest in magnitude among the calibrated loss values; and
use the minimum loss voltage as a target control voltage of the DC-DC converter, including operating the DC-DC converter in the buck mode when the operating mode is a motoring mode and the minimum loss voltage is less than the battery voltage; and when the required output power exceeds the calibrated power threshold, to close the bypass switch and thereby bypass the DC-DC converter.

* * * * *